(12) United States Patent
Maier

(10) Patent No.: US 8,079,622 B2
(45) Date of Patent: Dec. 20, 2011

(54) AXIALLY MOVEABLE SPOOL CONNECTOR

(75) Inventor: William C. Maier, Almond, NY (US)

(73) Assignee: Dresser-Rand Company, Olean, NY (US)

( * ) Notice: Subject to any disclaimer, the term of this patent is extended or adjusted under 35 U.S.C. 154(b) by 316 days.

(21) Appl. No.: 12/441,994

(22) PCT Filed: Sep. 25, 2007

(86) PCT No.: PCT/US2007/079349
§ 371 (c)(1),
(2), (4) Date: Apr. 15, 2009

(87) PCT Pub. No.: WO2008/039732
PCT Pub. Date: Apr. 3, 2008

(65) Prior Publication Data
US 2010/0007133 A1   Jan. 14, 2010

Related U.S. Application Data

(60) Provisional application No. 60/826,867, filed on Sep. 25, 2006.

(51) Int. Cl.
*F16D 3/84* (2006.01)
(52) U.S. Cl. ......... 285/368; 285/412; 285/415; 464/172
(58) Field of Classification Search ............ 285/368, 285/412, 414, 415; 417/360, 361, 422, 423.14; 464/170, 172
See application file for complete search history.

(56) References Cited

U.S. PATENT DOCUMENTS

| 335,592 | A | * | 2/1886 | Keyworth | 285/368 |
|---|---|---|---|---|---|
| 625,941 | A | * | 5/1899 | Sinclair | 285/368 |
| 815,812 | A | | 3/1906 | Gow | |
| 1,057,613 | A | | 4/1913 | Baldwin | |
| 1,061,656 | A | | 5/1913 | Black | |
| 1,480,775 | A | | 1/1924 | Marien | |
| 1,622,768 | A | | 3/1927 | Cook et al. | |
| 1,642,454 | A | | 9/1927 | Malmstrom | |
| 2,006,244 | A | | 6/1935 | Kopsa | |
| 2,300,766 | A | | 11/1942 | Baumann | |
| 2,303,311 | A | * | 11/1942 | Gredell | 285/368 |

(Continued)

FOREIGN PATENT DOCUMENTS

CA   2647511   10/2007

(Continued)

OTHER PUBLICATIONS

International Search Report of the International Searching Authority for Patent Cooperation Treaty Application No. PCT/US2007/079349, dated Apr. 2, 2008, pp. 1-2.

(Continued)

*Primary Examiner* — David E Bochna
(74) *Attorney, Agent, or Firm* — Edmonds & Nolte, PC

(57) ABSTRACT

A connector spool system for connecting a first component and a second component of an industrial compression system includes a connector spool having a substantially cylindrical shape. The spool includes an axial end and a flange at the axial end, the flange defining a radial surface for positioning proximate the first component. A spacer is positioned between the flange of the spool and the first component, the spacer including radial surfaces for providing uniform compressive force transmission between the spool and the first component.

17 Claims, 3 Drawing Sheets

U.S. PATENT DOCUMENTS

| | | | |
|---|---|---|---|
| 2,328,031 A | 8/1943 | Risley | |
| 2,345,437 A | 3/1944 | Tinker | |
| 2,520,755 A * | 8/1950 | Brown, Jr. | 285/415 |
| 2,602,462 A | 7/1952 | Barrett | |
| 2,811,303 A | 10/1957 | Ault et al. | |
| 2,836,117 A | 5/1958 | Lankford | |
| 2,857,850 A * | 10/1958 | Tsiguloff | 417/422 |
| 2,868,565 A | 1/1959 | Suderow | |
| 2,897,917 A | 8/1959 | Hunter | |
| 2,899,042 A * | 8/1959 | Wiseman | 198/666 |
| 2,911,239 A * | 11/1959 | Marzolf, Sr. | 285/415 |
| 2,932,360 A | 4/1960 | Hungate | |
| 2,954,841 A | 10/1960 | Reistle | |
| 2,992,838 A * | 7/1961 | Wallace | 285/368 |
| 3,044,657 A | 7/1962 | Horton | |
| 3,191,364 A | 6/1965 | Sylvan | |
| 3,198,214 A | 8/1965 | Lorenz | |
| 3,204,696 A | 9/1965 | De Priester et al. | |
| 3,213,794 A | 10/1965 | Adams | |
| 3,220,245 A | 11/1965 | Van Winkle | |
| 3,273,325 A | 9/1966 | Gerhold | |
| 3,324,798 A * | 6/1967 | Freed et al. | 417/360 |
| 3,352,577 A | 11/1967 | Medney | |
| 3,395,511 A | 8/1968 | Akerman | |
| 3,420,434 A | 1/1969 | Swearingen | |
| 3,431,747 A | 3/1969 | Hasheimi et al. | |
| 3,454,163 A | 7/1969 | Read | |
| 3,487,432 A | 12/1969 | Jenson | |
| 3,490,209 A | 1/1970 | Fernandes et al. | |
| 3,500,614 A | 3/1970 | Soo | |
| 3,578,342 A | 5/1971 | Satterthwaite et al. | |
| 3,628,812 A | 12/1971 | Larralde et al. | |
| 3,672,733 A | 6/1972 | Arsenius et al. | |
| 3,814,486 A | 6/1974 | Schurger | |
| 3,829,179 A | 8/1974 | Kurita et al. | |
| 3,915,673 A | 10/1975 | Tamai et al. | |
| 3,975,123 A | 8/1976 | Schibbye | |
| 4,033,647 A | 7/1977 | Beavers | |
| 4,059,364 A | 11/1977 | Andersen et al. | |
| 4,078,809 A | 3/1978 | Garrick et al. | |
| 4,087,261 A | 5/1978 | Hays | |
| 4,101,112 A * | 7/1978 | Conners et al. | 251/148 |
| 4,103,899 A | 8/1978 | Turner | |
| 4,112,687 A | 9/1978 | Dixon | |
| 4,117,359 A | 9/1978 | Wehde | |
| 4,135,542 A | 1/1979 | Chisholm | |
| 4,141,283 A | 2/1979 | Swanson et al. | |
| 4,146,261 A | 3/1979 | Edmaier et al. | |
| 4,165,622 A | 8/1979 | Brown, Jr. | |
| 4,174,925 A | 11/1979 | Pfenning et al. | |
| 4,182,480 A | 1/1980 | Theyse et al. | |
| 4,197,990 A | 4/1980 | Carberg et al. | |
| 4,205,927 A | 6/1980 | Simmons | |
| 4,227,373 A | 10/1980 | Amend et al. | |
| 4,258,551 A | 3/1981 | Ritzi | |
| 4,259,045 A | 3/1981 | Teruyama | |
| 4,278,200 A | 7/1981 | Gunnewig | |
| 4,298,311 A | 11/1981 | Ritzi | |
| 4,333,748 A | 6/1982 | Erickson | |
| 4,334,592 A | 6/1982 | Fair | |
| 4,336,693 A | 6/1982 | Hays et al. | |
| 4,339,923 A | 7/1982 | Hays et al. | |
| 4,347,900 A | 9/1982 | Barrington | |
| 4,363,608 A | 12/1982 | Mulders | |
| 4,374,583 A | 2/1983 | Barrington | |
| 4,375,975 A | 3/1983 | McNicholas | |
| 4,382,804 A | 5/1983 | Mellor | |
| 4,384,724 A | 5/1983 | Derman | |
| 4,391,102 A | 7/1983 | Studhalter et al. | |
| 4,396,361 A | 8/1983 | Fraser | |
| 4,432,470 A | 2/1984 | Sopha | |
| 4,438,638 A | 3/1984 | Hays et al. | |
| 4,441,322 A | 4/1984 | Ritzi | |
| 4,442,925 A | 4/1984 | Fukushima et al. | |
| 4,453,893 A | 6/1984 | Hutmaker | |
| 4,463,567 A | 8/1984 | Amend et al. | |
| 4,468,234 A | 8/1984 | McNicholas | |
| 4,471,795 A | 9/1984 | Linhardt | |
| 4,477,223 A | 10/1984 | Giroux | |
| 4,502,839 A | 3/1985 | Maddox et al. | |
| 4,511,309 A | 4/1985 | Maddox | |
| 4,531,888 A | 7/1985 | Buchelt | |
| 4,536,134 A | 8/1985 | Huiber | |
| 4,541,531 A | 9/1985 | Brule | |
| 4,541,607 A | 9/1985 | Hotger | |
| 4,570,701 A * | 2/1986 | Roberts | 285/368 |
| 4,573,527 A * | 3/1986 | McDonough | 285/368 |
| 4,574,815 A | 3/1986 | West et al. | |
| 4,648,806 A | 3/1987 | Alexander | |
| 4,687,017 A | 8/1987 | Danko et al. | |
| 4,737,081 A | 4/1988 | Nakajima et al. | |
| 4,752,185 A | 6/1988 | Butler et al. | |
| 4,807,664 A | 2/1989 | Wilson et al. | |
| 4,810,174 A * | 3/1989 | Stuckey et al. | 417/423.14 |
| 4,813,495 A | 3/1989 | Leach | |
| 4,821,737 A | 4/1989 | Nelson | |
| 4,826,403 A | 5/1989 | Catlow | |
| 4,830,331 A | 5/1989 | Vindum | |
| 4,832,709 A | 5/1989 | Nagyszalanczy | |
| 4,850,818 A * | 7/1989 | Kotera | 417/423.14 |
| 4,854,826 A * | 8/1989 | Kleineisel | 417/360 |
| 4,904,284 A | 2/1990 | Hanabusa | |
| 4,984,830 A | 1/1991 | Saunders | |
| 5,007,328 A | 4/1991 | Otteman | |
| 5,024,585 A | 6/1991 | Kralovec | |
| 5,043,617 A | 8/1991 | Rostron | |
| 5,044,701 A | 9/1991 | Watanabe et al. | |
| 5,045,046 A | 9/1991 | Bond | |
| 5,054,995 A | 10/1991 | Haseley et al. | |
| 5,064,452 A | 11/1991 | Yano et al. | |
| 5,080,137 A | 1/1992 | Adams | |
| 5,190,440 A | 3/1993 | Maier et al. | |
| 5,202,024 A | 4/1993 | Andersson et al. | |
| 5,202,026 A | 4/1993 | Lema | |
| 5,203,891 A | 4/1993 | Lema | |
| 5,207,810 A | 5/1993 | Sheth | |
| 5,211,427 A | 5/1993 | Washizu | |
| 5,246,346 A | 9/1993 | Schiesser | |
| 5,285,123 A | 2/1994 | Kataoka et al. | |
| 5,306,051 A | 4/1994 | Loker et al. | |
| 5,337,779 A | 8/1994 | Fukuhara | |
| 5,344,291 A * | 9/1994 | Antkowiak | 417/423.13 |
| 5,378,121 A | 1/1995 | Hackett | |
| 5,385,446 A | 1/1995 | Hays | |
| 5,421,708 A | 6/1995 | Utter | |
| 5,437,482 A * | 8/1995 | Curtis | 285/368 |
| 5,443,581 A | 8/1995 | Malone | |
| 5,484,521 A | 1/1996 | Kramer | |
| 5,496,394 A | 3/1996 | Nied | |
| 5,500,039 A | 3/1996 | Mori et al. | |
| 5,525,034 A | 6/1996 | Hays | |
| 5,525,146 A | 6/1996 | Straub | |
| 5,531,811 A | 7/1996 | Kloberdanz | |
| 5,538,259 A | 7/1996 | Uhrner et al. | |
| 5,542,831 A | 8/1996 | Scarfone | |
| 5,575,309 A | 11/1996 | Connell | |
| 5,585,000 A | 12/1996 | Sassi | |
| 5,605,172 A | 2/1997 | Schubert et al. | |
| 5,628,623 A | 5/1997 | Skaggs | |
| 5,634,492 A | 6/1997 | Steinruck et al. | |
| 5,640,472 A | 6/1997 | Meinzer et al. | |
| 5,641,280 A | 6/1997 | Timuska | |
| 5,653,347 A | 8/1997 | Larsson | |
| 5,664,420 A | 9/1997 | Hays | |
| 5,682,759 A | 11/1997 | Hays | |
| 5,683,235 A | 11/1997 | Welch | |
| 5,685,691 A | 11/1997 | Hays | |
| 5,687,249 A | 11/1997 | Kato | |
| 5,693,125 A | 12/1997 | Dean | |
| 5,703,424 A | 12/1997 | Dorman | |
| 5,709,528 A | 1/1998 | Hablanian | |
| 5,713,720 A | 2/1998 | Barhoum | |
| 5,720,799 A | 2/1998 | Hays | |
| 5,750,040 A | 5/1998 | Hays | |
| 5,775,882 A | 7/1998 | Kiyokawa et al. | |
| 5,779,619 A | 7/1998 | Borgstrom et al. | |
| 5,795,135 A | 8/1998 | Nyilas et al. | |

| | | | |
|---|---|---|---|
| 5,800,092 A | 9/1998 | Nill et al. | |
| 5,848,616 A | 12/1998 | Vogel et al. | |
| 5,850,857 A | 12/1998 | Simpson | |
| 5,853,585 A | 12/1998 | Nesseth | |
| 5,863,023 A | 1/1999 | Evans et al. | |
| 5,899,435 A | 5/1999 | Mitsch et al. | |
| 5,935,053 A | 8/1999 | Strid | |
| 5,938,803 A | 8/1999 | Dries | |
| 5,938,819 A | 8/1999 | Seery | |
| 5,946,915 A | 9/1999 | Hays | |
| 5,951,066 A | 9/1999 | Lane et al. | |
| 5,965,022 A | 10/1999 | Gould | |
| 5,967,746 A | 10/1999 | Hagi et al. | |
| 5,971,702 A | 10/1999 | Afton et al. | |
| 5,971,907 A | 10/1999 | Johannemann et al. | |
| 5,980,218 A | 11/1999 | Takahashi et al. | |
| 5,988,524 A | 11/1999 | Odajima et al. | |
| 6,035,934 A | 3/2000 | Stevenson et al. | |
| 6,059,539 A | 5/2000 | Nyilas et al. | |
| 6,068,447 A | 5/2000 | Foege | |
| 6,090,174 A | 7/2000 | Douma et al. | |
| 6,090,299 A | 7/2000 | Hays et al. | |
| 6,113,675 A | 9/2000 | Branstetter | |
| 6,122,915 A | 9/2000 | Hays | |
| 6,123,363 A | 9/2000 | Burgard et al. | |
| 6,145,844 A | 11/2000 | Waggott | |
| 6,149,825 A | 11/2000 | Gargas | |
| 6,151,881 A | 11/2000 | Ai et al. | |
| 6,190,261 B1 * | 2/2001 | Powell | 464/170 |
| 6,196,962 B1 | 3/2001 | Purvey et al. | |
| 6,202,981 B1 * | 3/2001 | Davis et al. | 285/93 |
| 6,206,202 B1 | 3/2001 | Galk et al. | |
| 6,214,075 B1 | 4/2001 | Filges et al. | |
| 6,217,637 B1 | 4/2001 | Toney et al. | |
| 6,227,379 B1 | 5/2001 | Nesseth | |
| 6,277,278 B1 | 8/2001 | Conrad et al. | |
| 6,312,021 B1 | 11/2001 | Thomas | |
| 6,314,738 B1 | 11/2001 | Hays | |
| 6,372,006 B1 | 4/2002 | Pregenzer et al. | |
| 6,375,437 B1 | 4/2002 | Nolan | |
| 6,383,262 B1 | 5/2002 | Marthinsen et al. | |
| 6,394,764 B1 | 5/2002 | Samurin | |
| 6,398,521 B1 * | 6/2002 | Yorulmazoglu | 417/360 |
| 6,398,973 B1 | 6/2002 | Saunders et al. | |
| 6,402,465 B1 | 6/2002 | Maier | |
| 6,426,010 B1 | 7/2002 | Lecoffre et al. | |
| 6,464,469 B1 | 10/2002 | Grob et al. | |
| 6,467,988 B1 | 10/2002 | Czachor et al. | |
| 6,468,426 B1 | 10/2002 | Klass | |
| 6,485,536 B1 | 11/2002 | Masters | |
| 6,530,484 B1 | 3/2003 | Bosman | |
| 6,530,979 B2 | 3/2003 | Firey | |
| 6,531,066 B1 | 3/2003 | Saunders et al. | |
| 6,537,035 B2 | 3/2003 | Shumway | |
| 6,540,917 B1 | 4/2003 | Rachels et al. | |
| 6,547,037 B2 | 4/2003 | Kuzdzal | |
| 6,592,654 B2 | 7/2003 | Brown | |
| 6,596,046 B2 | 7/2003 | Conrad et al. | |
| 6,599,086 B2 | 7/2003 | Soja | |
| 6,607,348 B2 | 8/2003 | Jean | |
| 6,616,719 B1 | 9/2003 | Sun et al. | |
| 6,617,731 B1 | 9/2003 | Goodnick | |
| 6,629,825 B2 | 10/2003 | Stickland et al. | |
| 6,631,617 B1 | 10/2003 | Dreiman et al. | |
| 6,658,986 B2 | 12/2003 | Pitla et al. | |
| 6,659,143 B1 | 12/2003 | Taylor et al. | |
| 6,669,845 B2 | 12/2003 | Klass | |
| 6,688,802 B2 | 2/2004 | Ross et al. | |
| 6,707,200 B2 | 3/2004 | Carroll et al. | |
| 6,718,955 B1 | 4/2004 | Knight | |
| 6,719,830 B2 | 4/2004 | Illingworth et al. | |
| 6,764,284 B2 | 7/2004 | Oehman, Jr. | |
| 6,776,812 B2 | 8/2004 | Komura et al. | |
| 6,802,693 B2 | 10/2004 | Reinfeld et al. | |
| 6,802,881 B2 | 10/2004 | Illingworth et al. | |
| 6,811,713 B2 | 11/2004 | Arnaud | |
| 6,817,846 B2 | 11/2004 | Bennitt | |
| 6,837,913 B2 | 1/2005 | Schilling et al. | |
| 6,843,836 B2 | 1/2005 | Kitchener | |
| 6,878,187 B1 | 4/2005 | Hays et al. | |
| 6,893,208 B2 | 5/2005 | Frosini et al. | |
| 6,907,933 B2 | 6/2005 | Choi et al. | |
| 6,979,358 B2 | 12/2005 | Ekker | |
| 7,001,448 B1 | 2/2006 | West | |
| 7,013,978 B2 | 3/2006 | Appleford et al. | |
| 7,022,150 B2 | 4/2006 | Borgstrom et al. | |
| 7,022,153 B2 | 4/2006 | McKenzie | |
| 7,025,890 B2 | 4/2006 | Moya | |
| 7,033,410 B2 | 4/2006 | Hilpert et al. | |
| 7,033,411 B2 | 4/2006 | Carlsson et al. | |
| 7,056,363 B2 | 6/2006 | Carlsson et al. | |
| 7,063,465 B1 | 6/2006 | Wilkes et al. | |
| 7,112,036 B2 | 9/2006 | Lubell et al. | |
| 7,131,292 B2 | 11/2006 | Ikegami et al. | |
| 7,144,226 B2 | 12/2006 | Pugnet et al. | |
| 7,159,723 B2 | 1/2007 | Hilpert et al. | |
| 7,160,518 B2 | 1/2007 | Chen et al. | |
| 7,169,305 B2 | 1/2007 | Gomez | |
| 7,185,447 B2 | 3/2007 | Arbeiter | |
| 7,204,241 B2 | 4/2007 | Thompson | |
| 7,216,899 B2 * | 5/2007 | Crawford | 285/414 |
| 7,241,392 B2 | 7/2007 | Maier | |
| 7,244,111 B2 | 7/2007 | Suter et al. | |
| 7,258,713 B2 | 8/2007 | Eubank et al. | |
| 7,270,145 B2 | 9/2007 | Koezler | |
| 7,288,202 B2 | 10/2007 | Maier | |
| 7,314,560 B2 | 1/2008 | Yoshida et al. | |
| 7,322,805 B2 * | 1/2008 | Biver et al. | 417/423.1 |
| 7,323,023 B2 | 1/2008 | Michele et al. | |
| 7,328,749 B2 | 2/2008 | Reitz | |
| 7,335,313 B2 | 2/2008 | Moya | |
| 7,377,110 B2 | 5/2008 | Sheridan et al. | |
| 7,381,235 B2 | 6/2008 | Koene et al. | |
| 7,396,373 B2 | 7/2008 | Lagerstedt et al. | |
| 7,399,412 B2 | 7/2008 | Keuschnigg | |
| 7,435,290 B2 | 10/2008 | Lane et al. | |
| 7,445,653 B2 | 11/2008 | Trautmann et al. | |
| 7,470,299 B2 | 12/2008 | Han et al. | |
| 7,473,083 B2 | 1/2009 | Oh et al. | |
| 7,479,171 B2 | 1/2009 | Cho et al. | |
| 7,494,523 B2 | 2/2009 | Oh et al. | |
| 7,501,002 B2 | 3/2009 | Han et al. | |
| 7,520,210 B2 | 4/2009 | Theodore, Jr. et al. | |
| 7,520,816 B1 * | 4/2009 | Brisk | 464/172 |
| 7,575,422 B2 | 8/2009 | Bode et al. | |
| 7,578,863 B2 | 8/2009 | Becker et al. | |
| 7,591,882 B2 | 9/2009 | Harazim | |
| 7,594,941 B2 | 9/2009 | Zheng et al. | |
| 7,594,942 B2 | 9/2009 | Polderman | |
| 7,610,955 B2 | 11/2009 | Irwin, Jr. | |
| 7,628,836 B2 | 12/2009 | Baronet et al. | |
| 7,637,699 B2 | 12/2009 | Albrecht | |
| 7,674,377 B2 | 3/2010 | Carew | |
| 7,677,308 B2 | 3/2010 | Kolle | |
| 7,677,611 B2 * | 3/2010 | Holzheu | 285/351 |
| 7,708,537 B2 | 5/2010 | Bhatia et al. | |
| 7,708,808 B1 | 5/2010 | Heumann | |
| 7,744,663 B2 | 6/2010 | Wallace | |
| 7,748,079 B2 | 7/2010 | McDowell et al. | |
| 7,766,989 B2 | 8/2010 | Lane et al. | |
| 7,811,344 B1 | 10/2010 | Duke et al. | |
| 7,811,347 B2 | 10/2010 | Carlsson et al. | |
| 7,815,415 B2 | 10/2010 | Kanezawa et al. | |
| 7,824,458 B2 | 11/2010 | Borgstrom et al. | |
| 7,824,459 B2 | 11/2010 | Borgstrom et al. | |
| 7,828,531 B2 * | 11/2010 | Heng et al. | 417/423.15 |
| 7,846,228 B1 | 12/2010 | Saaski et al. | |
| 2001/0007283 A1 | 7/2001 | Johal et al. | |
| 2002/0009361 A1 | 1/2002 | Reichert et al. | |
| 2003/0029318 A1 | 2/2003 | Firey | |
| 2003/0035718 A1 | 2/2003 | Langston et al. | |
| 2003/0136094 A1 | 7/2003 | Illingworth et al. | |
| 2004/0007261 A1 | 1/2004 | Cornwell | |
| 2004/0170505 A1 | 9/2004 | Lenderink et al. | |
| 2005/0173337 A1 | 8/2005 | Costinel | |
| 2006/0065609 A1 | 3/2006 | Arthur | |
| 2006/0090430 A1 | 5/2006 | Trautman et al. | |
| 2006/0096933 A1 | 5/2006 | Maier | |

| | | | |
|---|---|---|---|
| 2006/0157251 | A1 | 7/2006 | Stinessen et al. |
| 2006/0157406 | A1 | 7/2006 | Maier |
| 2006/0193728 | A1 | 8/2006 | Lindsey et al. |
| 2006/0222515 | A1 | 10/2006 | Delmotte et al. |
| 2006/0230933 | A1 | 10/2006 | Harazim |
| 2006/0239831 | A1 | 10/2006 | Garris, Jr. |
| 2006/0254659 | A1 | 11/2006 | Bellott et al. |
| 2006/0275160 | A1 | 12/2006 | Leu et al. |
| 2007/0029091 | A1 | 2/2007 | Stinessen et al. |
| 2007/0036646 | A1 | 2/2007 | Nguyen et al. |
| 2007/0051245 | A1 | 3/2007 | Yun |
| 2007/0062374 | A1 | 3/2007 | Kolle |
| 2007/0065317 | A1 | 3/2007 | Stock |
| 2007/0084340 | A1 | 4/2007 | Dou et al. |
| 2007/0140870 | A1 | 6/2007 | Fukanuma et al. |
| 2007/0151922 | A1 | 7/2007 | Mian |
| 2007/0163215 | A1 | 7/2007 | Lagerstadt |
| 2007/0172363 | A1 | 7/2007 | Laboube et al. |
| 2007/0196215 | A1 | 8/2007 | Frosini et al. |
| 2007/0227969 | A1 | 10/2007 | Dehaene et al. |
| 2007/0294986 | A1 | 12/2007 | Beetz |
| 2008/0031732 | A1 | 2/2008 | Peer et al. |
| 2008/0039732 | A9 | 2/2008 | Bowman |
| 2008/0246281 | A1 | 10/2008 | Agrawal et al. |
| 2008/0315812 | A1 | 12/2008 | Balboul |
| 2009/0013658 | A1 | 1/2009 | Borgstrom et al. |
| 2009/0015012 | A1 | 1/2009 | Metzler et al. |
| 2009/0025562 | A1 | 1/2009 | Hallgren et al. |
| 2009/0025563 | A1 | 1/2009 | Borgstrom et al. |
| 2009/0151928 | A1 | 6/2009 | Lawson |
| 2009/0159523 | A1 | 6/2009 | McCutchen |
| 2009/0169407 | A1 | 7/2009 | Yun |
| 2009/0173095 | A1 | 7/2009 | Bhatia et al. |
| 2009/0266231 | A1 | 10/2009 | Franzen et al. |
| 2009/0304496 | A1 | 12/2009 | Maier |
| 2009/0321343 | A1 | 12/2009 | Maier |
| 2009/0324391 | A1 | 12/2009 | Maier |
| 2010/0007133 | A1 | 1/2010 | Maier |
| 2010/0021292 | A1 | 1/2010 | Maier et al. |
| 2010/0038309 | A1 | 2/2010 | Maier |
| 2010/0043288 | A1 | 2/2010 | Wallace |
| 2010/0043364 | A1 | 2/2010 | Curien |
| 2010/0044966 | A1 | 2/2010 | Majot et al. |
| 2010/0072121 | A1 | 3/2010 | Maier |
| 2010/0074768 | A1 | 3/2010 | Maier |
| 2010/0083690 | A1 | 4/2010 | Sato et al. |
| 2010/0090087 | A1 | 4/2010 | Maier |
| 2010/0143172 | A1 | 6/2010 | Sato et al. |
| 2010/0163232 | A1 | 7/2010 | Kolle |
| 2010/0183438 | A1 | 7/2010 | Maier et al. |
| 2010/0239419 | A1 | 9/2010 | Maier et al. |
| 2010/0239437 | A1 | 9/2010 | Maier |
| 2010/0247299 | A1 | 9/2010 | Maier |
| 2010/0257827 | A1 | 10/2010 | Lane et al. |
| 2011/0017307 | A1 | 1/2011 | Kidd et al. |
| 2011/0061536 | A1 | 3/2011 | Maier et al. |

FOREIGN PATENT DOCUMENTS

| | | | |
|---|---|---|---|
| EP | 301285 | | 10/1991 |
| EP | 1582703 | | 10/2005 |
| EP | 2013479 | | 1/2009 |
| EP | 7838631.5 | | 12/2009 |
| GB | 2323639 | | 9/1998 |
| GB | 2337561 | | 11/1999 |
| JP | 54099206 | | 1/1978 |
| JP | 08 068501 | | 3/1996 |
| JP | 8-284961 | A | 11/1996 |
| JP | 2002 242699 | | 8/2002 |
| JP | 2004034017 | A | 2/2004 |
| JP | 3711028 | | 10/2005 |
| JP | 2005291202 | | 10/2005 |
| KR | 2009085521 | | 2/2008 |
| MX | 2008012579 | | 12/2008 |
| WO | 9524563 | | 9/1995 |
| WO | 0117096 | | 3/2001 |
| WO | 2007043889 | | 4/2007 |
| WO | 2007103248 | | 9/2007 |
| WO | 2007120506 | | 10/2007 |
| WO | 2008036221 | | 3/2008 |
| WO | 2008039446 | | 3/2008 |
| WO | 2008039491 | | 4/2008 |
| WO | 2008039731 | | 4/2008 |
| WO | 2008039732 | | 4/2008 |
| WO | 2008039733 | | 4/2008 |
| WO | 2008039734 | | 4/2008 |
| WO | 2008036394 | | 7/2008 |
| WO | 2009111616 | | 9/2009 |
| WO | 2009158252 | | 12/2009 |
| WO | 2009158253 | | 12/2009 |
| WO | 2010083416 | | 7/2010 |
| WO | 2010083427 | | 7/2010 |
| WO | 2010107579 | | 9/2010 |
| WO | 2010110992 | | 9/2010 |
| WO | 2011034764 | | 3/2011 |

OTHER PUBLICATIONS

Technical Manual—High Pressure Air Compressor Model 13NL45; Navsea S6220-AT-MMA-010/93236, pp. 3-23 to 3-32, Electric Boat Corporation, Groton, CT 06340, Oct. 28, 1991.
PCT/US2007/008149 International Preliminary Report on Patentability dated Sep. 30, 2008.
PCT/US2007/008149 International Search Report and Written Opinion dated Jul. 17, 2008.
PCT/US2007/020101 International Preliminary Report on Patentability dated Apr. 2, 2009.
PCT/US2007/020101 International Search Report dated Apr. 29, 2008.
PCT/US2007/020101 Written Opinion dated Mar. 19, 2009.
PCT/US2007/020471 International Preliminary Report on Patentability dated Apr. 2, 2009.
PCT/US2007/020471 International Search Report and Written Opinion dated Apr. 1, 2008.
PCT/US2007/020659 International Preliminary Report on Patentability dated Mar. 31, 2009.
PCT/US2007/020659 International Search Report and Written Opinion dated Sep. 17, 2008.
PCT/US2007/020768 International Preliminary Report on Patentability dated Mar. 31, 2009.
PCT/US2007/020768 International Search Report and Written Opinion dated Mar. 3, 2008.
PCT/US2007/079348 International Preliminary Report on Patentability dated Mar. 31, 2009.
PCT/US2007/079348 International Search Report dated Apr. 11, 2008.
PCT/US2007/079348 Written Opinion dated Jan. 25, 2008.
PCT/US2007/079349 International Preliminary Report on Patentability dated Mar. 31, 2009.
PCT/US2007/079349 International Search Report and Written Opinion dated Apr. 2, 2008.
PCT/US2007/079350 International Preliminary Report on Patentability dated Mar. 31, 2009.
PCT/US2007/079350 International Search Report dated Jul. 17, 2008.
PCT/US2007/079350 Written Opinion dated Mar. 25, 2009.
PCT/US2007/079352 International Preliminary Report on Patentability dated Mar. 31, 2009.
PCT/US2007/079352 International Search Report and Written Opinion dated Aug. 27, 2008.
PCT/US2009/036142 International Preliminary Report on Patentability dated Sep. 16, 2010.
PCT/US2009/036142 International Search Report dated Jan. 7, 2010.
PCT/US2009/036142 Written Opinion dated May 11, 2009.
PCT/US2009/047662 International Preliminary Report on Patentability dated Jan. 13, 2011.
PCT/US2009/047662 Written Opinion dated Aug. 20, 2009.
PCT/US2010/021199 International Search Report and Written Opinion dated Mar. 22, 2010.
PCT/US2010/021199 International Preliminary Report on Patentability dated Mar. 29, 2011.
PCT/US2010/021218 International Search Report and Written Opinion dated Mar. 23, 2010.

PCT/US2010/021218 International Report on Patentability dated Feb. 2, 2011.
PCT/US2010/025650 International Search Report and Written Opinion dated Apr. 22, 2010.
PCT/US2010/025650 International Report on Patentability dated Mar. 14, 2011.
PCT/US2010/025952 International Search Report and Written Opinion dated Apr. 12, 2010.
PCT/US2010/025952 International Report on Patentability dated Mar. 14, 2011.
PCT/US2009/047667 International Report on Patentability dated Jan. 13, 2011.
PCT/US2009/047667 Written Opinion dated Aug. 7, 2009.
PCT/US2009/047667 International Search Report dated Dec. 30, 2009.
Dresser-Rand, Inc. "High Pressure Air Compressor Model 13NL45," Oct. 28, 1991, 14 pages.

* cited by examiner

AXIALLY MOVEABLE SPOOL CONNECTOR

CROSS-REFERENCE

This application is a United States national phase application of co-pending international patent application No. PCT/US2007/079349, filed Sep. 25, 2007, which claims priority to U.S. Provisional Patent Application No. 60/826,867, filed Sep. 25, 2006, the disclosures of which are Incorporated herein by reference.

BACKGROUND

The present invention relates to connection members for components of a close-coupled pressurized system and, more particularly, a connector spool assembly provided with adjustment components to allow movement of the connector spool to facilitate separation and removal of system components.

One type of compression system is a compressor close-coupled to an electric motor driver, which provides for a compact design with significant benefits over traditional base-plate mounted compressor trains. A motor casing and a compressor casing comprise separate bodies requiring removal for service. One problem with component removal service activity is the cost and time required to disconnect process piping and instrumentation connected to each casing. Individual case removal is especially problematic for applications where the unit has compressor casings at each end of a double ended motor drive.

SUMMARY

In one embodiment, the invention provides a connector spool system for connecting a first component and a second component of an industrial compression system. The spool system includes a connector spool having a substantially cylindrical shape, the spool including an axial end and a flange at the axial end, the flange defining a radial surface for positioning proximate the first component. A spacer is positioned between the flange of the spool and the first component, the spacer including radial surfaces for providing uniform compressive force transmission between the spool and the first component.

In another embodiment, the invention provides a connector spool system includes a connector spool having a substantially cylindrical shape, the spool including first and second axial ends and a flange at each axial end, the first flange releasably coupled to the first component and the second flange releasably coupled to the second component. The connector spool is axially movable relative to the components. The spool system also includes a spacer positioned between the first flange of the spool and the first component, the spacer including radial surfaces for providing uniform compressive force transmission between the spool and the first component.

Other aspects of the invention will become apparent by consideration of the detailed description and accompanying drawings.

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the phraseology and terminology used herein is for the purpose of description and should not be regarded as limiting.

For example, terms like "central", "upper", "lower", "front", "rear", and the like are only used to simplify description of the present invention, and do not alone indicate or imply that the device or element referred to must have a particular orientation. The elements of the pressurized connector spool referred to in the present invention can be installed and operated in any orientation desired. In addition, terms such as "first", "second", and "third" are used herein for the purpose of description and are not intended to indicate or imply relative importance or significance.

DETAILED DESCRIPTION

Figure 1:
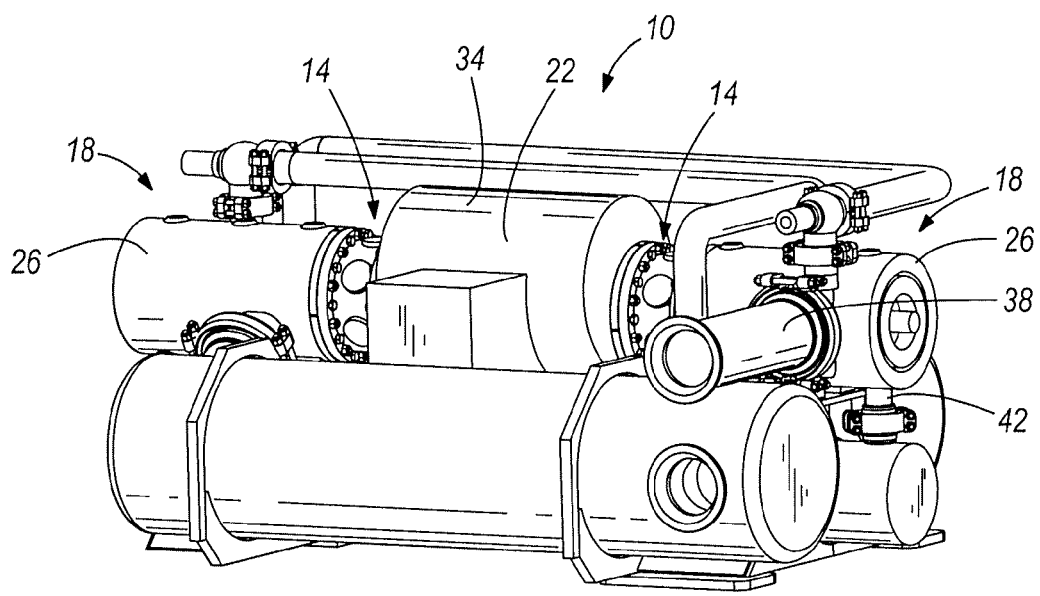
FIG. 1 is a perspective view of a compression system incorporating one embodiment of the invention.
Figure 2:
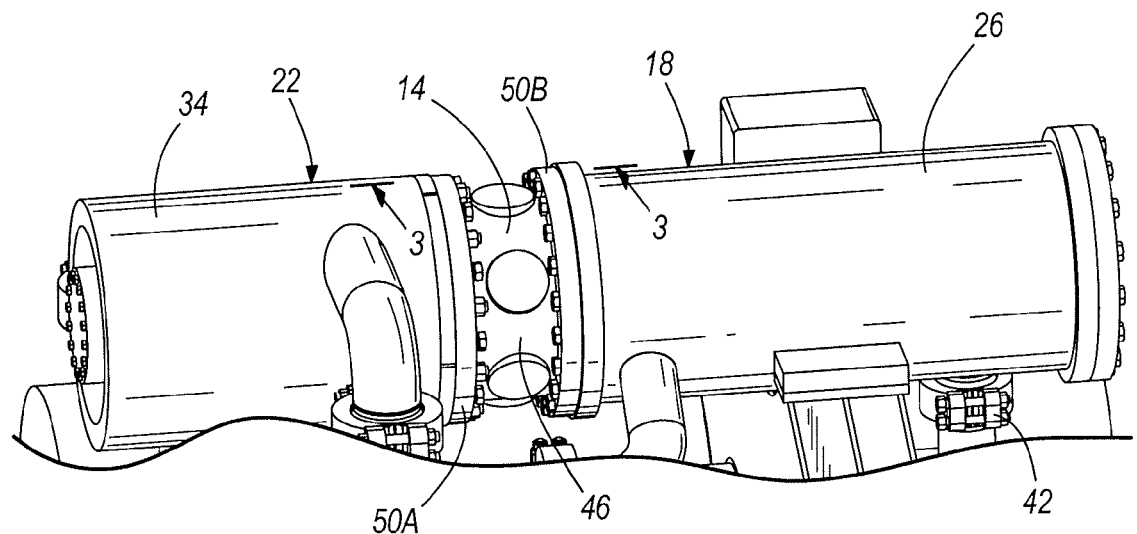
FIG. 2 is a perspective view of the compression system shown in FIG. 1, with access covers removed from a connector spool between a motor casing and a compressor casing.

FIG. 1 illustrates an industrial compression system 10 showing various components of the system, including connection means 14, that is connector spools, according to one embodiment of the invention. Industrial compression systems are used in industry to compress gases or fluids for industrial purposes. The system 10 might, for example, be used on an oil production platform. The industrial compression system 10 shown includes two compressors 18 close-coupled to a double-ended electric motor driver 22. This arrangement allows for a compact design with benefits over more traditional base-plate mounted compressor trains.

Each compressor 18 is surrounded by a cylindrical compressor casing 26 and the motor 22 is surrounded by a cylindrical motor casing 34. The compressor casings 26 and the motor casing 34 are separate bodies that are positioned to facilitate installation and removal of components for service. The connector spools 14 provide an assembly configuration that allows each of the compressor casings 26 and the motor casing 34 to be removed individually with minimum disturbance to other casings in a combined unit. In the illustrated embodiment, the connector spool 14 moves axially relative to the casings 26, 34 to facilitate separation and removal of the casing 26, 34.

Referring to FIG. 1, each compressor 18 includes a compressor inlet 38 and a compressor outlet 42. The compressor inlet 38 takes in a fluid or a gas to be compressed and after compression, discharges it through the outlet 42. Location and size of the inlet 38 and the outlet 42 may be widely varied as a matter of choice by the system designer.

In the industrial compression system 10 shown in FIG. 1, the motor 22 is double ended in order to drive two compressors 18, one on each side of the motor 22. A connector spool 14 is mounted at each end of the motor 22. Other forms of compression systems may have a single connector spool or multiple of connector spools, depending on the number of motors, compressors and the configuration of the system.

An embodiment of the connector spool 14 is shown in FIGS. 2-5, which show the connector spool 14 coupled between the cylindrical compressor casing 26 and the cylindrical motor casing 34. The connector spool 14 also provides a pressurized housing for a mechanical drive connection between the electric motor 22 and the compressor 18. The connector spool 14 allows each casing 26, 34 to be disconnected and removed individually without disturbing the other casings in the industrial compression system 10. The connector spool 14 includes a hollow cylindrical body 46, or casing, which mates with cylindrical casings 26, 34 used for the compressor 18 and the motor 22.

The connector spool 14 includes axial ends 50A, 50B, each having a flange 52A, 52B defining an aligned outer axial surface 54. The outer axial surfaces 54A, 54B mate with inner axial surfaces 58A, 58B on the compressor and the motor casings 26, 34 to keep the connector spool 14, the compressor casing 26 and the motor casing 30 aligned with respect to a rotational centerline 62 of the compression system 10. The connector spool 14 includes access ports 66 (FIGS. 3 and 4) through the outer casing 46 which provide access to an interior region 70 of the connector spool 14 and are covered by an access cover 74.

Figure 3:
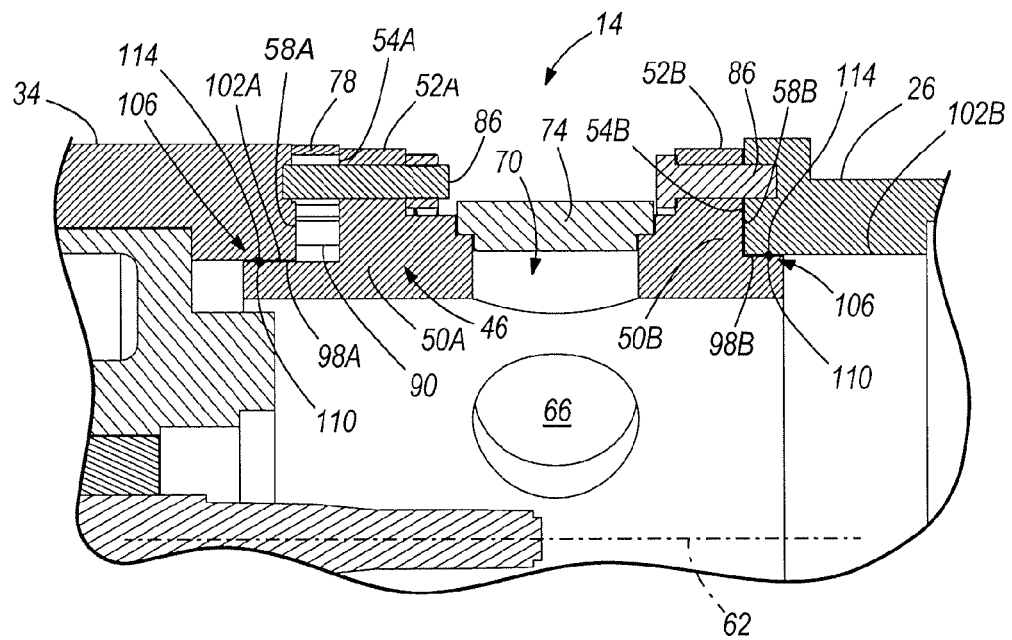
FIG. 3 is a section view of a portion of the compression system taken along line 3-3 shown in FIG. 2.
Figure 4:
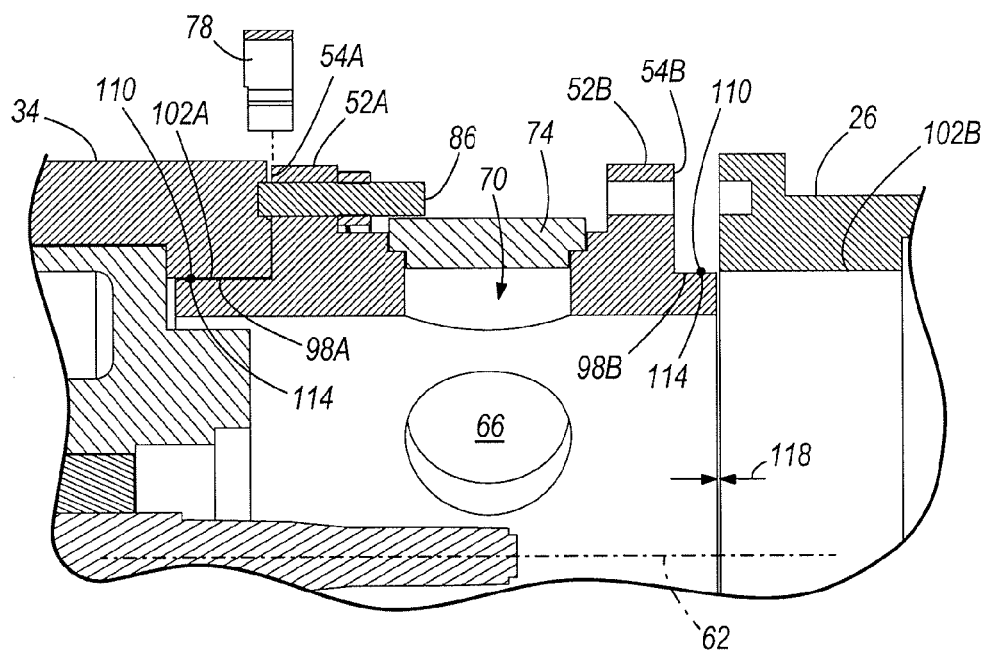
FIG. 4 is a section view of a portion of the compression system shown in FIG. 3 with axial spacers removed and the connector spool axially moved.
Figure 5:
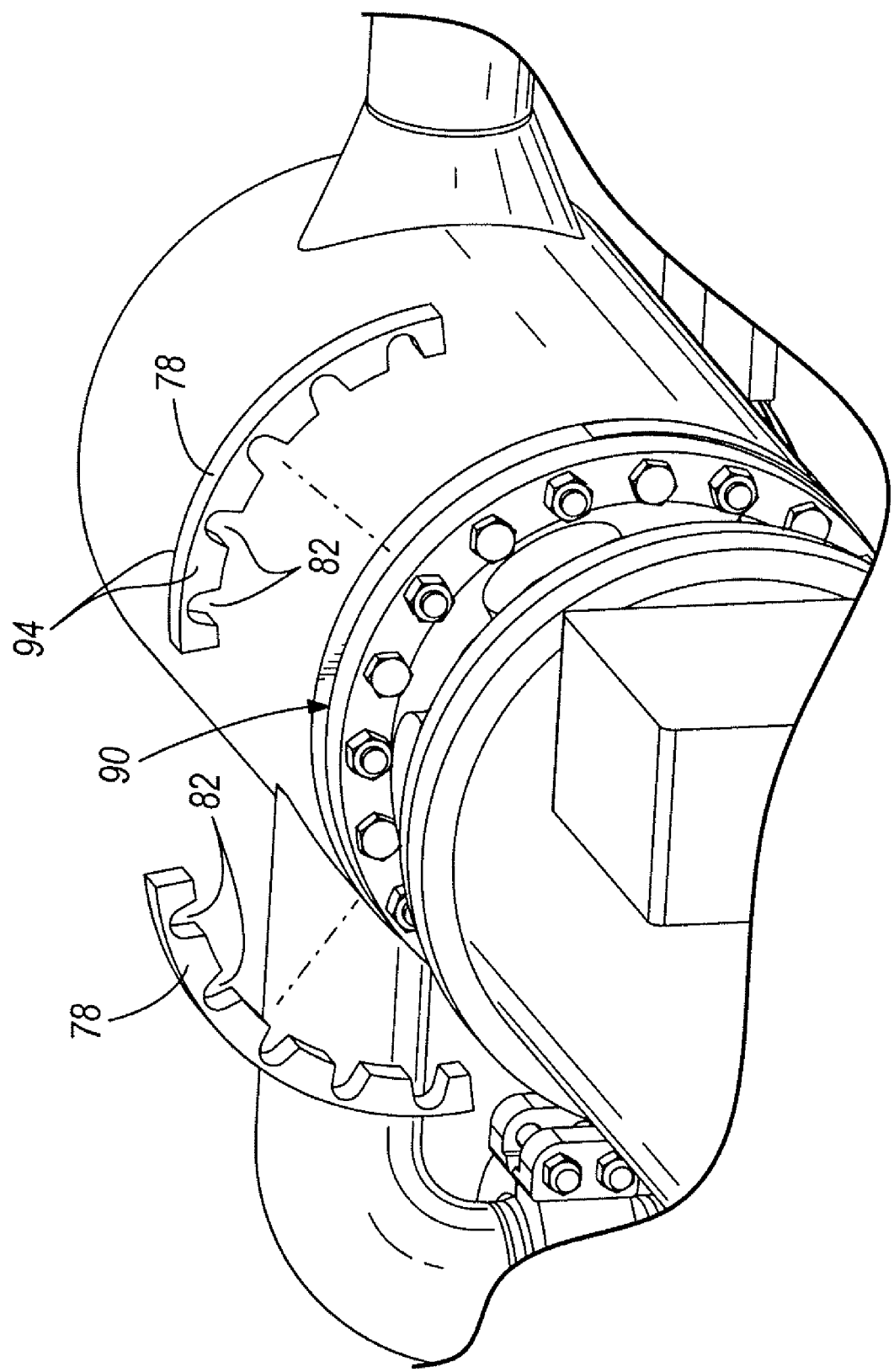
FIG. 5 is perspective view of a portion of the compression system showing the axial spacers removed from an operational position.

FIGS. 3 and 4 illustrate sectional views of the connector spool 14 along with portions of the compressor casing 26 and the motor casing 34. In FIG. 3, the connector spool 14 is in an operational position, such as during operation of the industrial compression system 10. In FIG. 4, the connector spool 14 is moved to a service position, such as during service of the industrial compression system 10. At one end 50A of the connector spool 14, proximate to the motor casing 34, an array of segmented spacers 78 is positioned. Each spacer 78 is a cylindrical segment with openings 82 (FIG. 5), or cutouts, for accommodating connectors 86, or bolts. In a further embodiment, radial clamping rings rather than axial connectors couple casings to the connector spool. The openings 82 are shaped to allow the spacer 78 to be removed or pulled out radially from an intentionally created structural gap 90 between the motor casing 34 and the connector spool 14 (FIGS. 4 and 5).

Removing the spacers 78 allows for axial movement of the connector spool 14 to facilitate maintenance procedures involving assembly and disassembly of components of the compression system 10. As shown in FIG. 4, axial movement of the connector spool 14 disengages the connector spool 14 from the compressor casing 26. With this movement, components of the compression system remain in place while still permitting removal of major components, such as the compressor casing 26 and/or the motor casing 34 as a single, intact unit. It should be readily apparent to those of skill in the art that in a further embodiment the spacer 78 are located at the compressor 50B end of the connector spool 14 whereby axial movement of the spool 14 disengages the spool 14 from the motor casing 34. Alternatively, spacers 78 may be located at both ends 50A, 50B of the connector spool 14. It is also contemplated that various modifications might be made to structural configuration of the spacers 78.

The spacers 78 are configured to permit tightening of connectors 86 to provide uniform compressive force transmission between the connector spool 14 and the motor casing 34. In the illustrated embodiment, each spacer 78 includes flat axial surfaces 94 that are parallel to each other. The surfaces 94 provide uniform compressive force transmission between the connector spool 14 and the motor casing 34 when the connectors 86 are tightened during assembly.

Referring to FIG. 3, outer axial ends 50A, 50B of the connector spool 14 include radial surfaces 98A, 98B for substantially parallel alignment with the centerline axis 62. The radial surfaces 98A, 98B in concert with mating inner radial surfaces 102A, 102B on the motor casing 34 and the compressor casing 26, respectively, maintain alignment of the connector spool 14 and the casings 26, 34 with respect to the rotational centerline 62 of the system 10. Sealing members 106 are positioned between the aligned radial surfaces 98A, 98B of the connector spool 14 and the casings 26, 34 to provide pressure sealing between the connector spool 14 and the casings 26, 34 when the system 10 is assembled. In the illustrated embodiment, the sealing members 106 are O-rings 110 positioned in grooves 114, which are machined into the surfaces 98A, 98B of the connector spool 14 and receive the O-rings 110. In a further embodiment, other sealing means may be used or the sealing members may be positioned at other locations between the connector spool 14 and the casings 26, 34.

Connectors 86 axially couple the connector spool 14 to the compressor casing 26 through the flange 52B. Spacers 78 are positioned between the connector spool flange 52A and the motor casing 34, and the connector spool 14, the spacers 78 and the motor casing 34 are coupled together by the connectors 86. The radial surfaces 98A, 98B of the connector spool 14 maintain the compressor and motor casings 26, 34 axially aligned and sealed with the sealing members 106.

Referring to FIG. 4, the connector spool 14 is axially moved to the service position. In the service position, connectors 86 are removed from a coupling between the connector spool 14 and the compressor casing 26. Further, the spacers 78 are removed from between the connector spool 14 and the motor casing 34, which is facilitated by loosening the connectors 86 therebetween. By removing the spacers 78 and connectors 86, the connector spool 14 is movable in the axial direction, which provides an axial gap 118 between the connector spool and the compressor casing 26, whereby the compressor casing 26 is removable for service.

In order to transition the industrial compression system 10 from fully assembled for the operational mode to disassembled for the service mode, the compression system 10 is taken out of service and vented, or depressurized. Access covers 74 are removed as necessary and interconnecting parts such as shaft couplings are removed or separated. The connectors 86 at the motor casing interface are loosened and the connectors 86 at the compressor casing interface are removed. The spacers 78 are removed from between the connector spool 14 and the motor casing 34, and at least one of the connectors 86 that couple the motor casing 34 is tightened to move the connector spool 14 axially toward the motor casing 34 to create the gap 118. At this stage, the compressor casing 26 may be removed for service.

If the industrial compression system includes a double ended motor drive 22, the process is repeated at an opposite end of the motor 22. While the movement process occurs, the casings 26, 34 are maintained vertically with respect to gravity on appropriate pedestals, feet or stands that provide support and keep the components in relatively close axial alignment. It is contemplated that this invention can be employed at connections between various compression system components in addition to the connection as described between the motor casing and the connector spool.

It should be readily apparent to those of skill in the art that the access cover may be used with various driver and driven equipment. For example, drivers include, but are not limited to, a motor, a turbine or an internal combustion engine, and driven equipment includes, but is not limited to, a compressor, a generator, or a pump.

The embodiments described above and illustrated in the figures are presented by way of example only and are not intended as a limitation upon the concepts and principles of the present invention. As such, it would be appreciated by one having ordinary skill in the art that various changes in the elements and their configuration and arrangement are possible without departing from the spirit and scope of the present invention.

Since other modifications, changes and substitutions are intended in the foregoing disclosure, it is appropriate that the appended claims be construed broadly and in a matter consistent with the scope of the invention.

What is claimed is:

1. A connector spool system, comprising:
a cylindrical connector spool including an axial end and a first flange arranged at the axial end, the first flange having a radial surface slidably engaging an inner radial surface of a first component; and
a first arcuate spacer removably positioned between the first flange and the first component,
wherein the connector spool further comprises a second flange for positioning the connector spool proximate a second component; and
wherein the second flange defines a radial surface that mates with an inner radial surface of the second component.

2. A connector spool system, comprising:
a cylindrical connector spool including an axial end and a first flange arranged at the axial end, the first flange having a radial surface slidably engaging an inner radial surface of a first component;
a first arcuate spacer removably positioned between the first flange and the first component; and
a second arcuate spacer removably positioned between the first flange and the first component and aligned with the first arcuate spacer to form a ring-shaped spacer member.

3. The connector spool system of claim 2, further comprising a sealing member positioned between the radial surface of the first flange and the inner radial surface of the first component.

4. The connector spool system of claim 2, wherein the connector spool is axially connected to the first component at the first flange, and the first arcuate spacer is disposed between the connector spool and the first component.

5. The connector spool system of claim 4, further comprising a connector for connecting the connector spool and the first component.

6. The connector spool system of claim 5, wherein the first arcuate spacer further comprises an aperture for accommodating positioning of the connector.

7. The connector spool system of claim 2, wherein the ring-shaped spacer member includes a first axial surface and a second axial surface, wherein the first and second axial surfaces are substantially parallel, and wherein the first axial surface mates with an outer axial surface of the connector spool, and the second axial surface mates with an inner axial surface of the first component.

8. The connector spool system of claim 2, wherein the first component is a motor casing and the second component is a compressor casing.

9. A connector spool system for connecting a first component to a second component, comprising:
a cylindrical connector spool axially-interposing the first and second components and including a first flange releasably coupled to the first component, and a second flange releasably coupled to the second component, the first flange having a radial surface slidably engaging an inner radial surface of the first component and the second flange having a radial surface that slidably engages an inner radial surface of the second component, wherein the connector spool is axially movable relative to the first and second components; and
a spacer removably positioned between the first flange of the connector spool and the first component.

10. The connector spool system of claim 9, wherein:
the first flange defines an axial surface positioned proximate to the first component; and
the second flange defines an axial surface positioned proximate to the second component.

11. The connector spool system of claim 9, further comprising a first sealing member positioned between the radial surface of the first flange and the first component, and a second sealing member positioned between the radial surface of the second flange and the second component.

12. The connector spool system of claim 9, wherein:
the connector spool is axially connected to the first component at the first flange and axially connected to the second component at the second flange; and
the first spacer is disposed between the connector spool and the first component.

13. The connector spool system of claim 12, further comprising connectors for connecting the connector spool and the first and second components.

14. The connector spool system of claim 9, wherein the first spacer comprises first and second arc segments that are removably coupled together such that the spacer is removable and aligned to form a ring-shaped spacer member.

15. The connector spool system of claim 9, wherein the first component is a motor casing and the second component is a compressor casing.

16. A connector spool system comprising:
a connector spool disposed axially between a compressor casing and a motor casing, for connecting the compressor and motor casings, the connector spool is being slidably movable between a first position in which the connector spool sealingly engages the compressor casing, and a second position in which the compressor casing is free from engagement with the connector spool; and
a spacer disposed between the connector spool and the motor casing to maintain the connector spool in the first position, the spacer being removable to allow the connector spool to slide toward the motor casing and into the second position.

17. The connector spool of claim 16, further comprising one or more access ports defined about a circumference of the connector spool to provide access to an interior region thereof.

* * * * *